P. SMAGEL.
HOUSEHOLD PRESS.
APPLICATION FILED MAY 7, 1915.
1,161,540.
Patented Nov. 23, 1915.
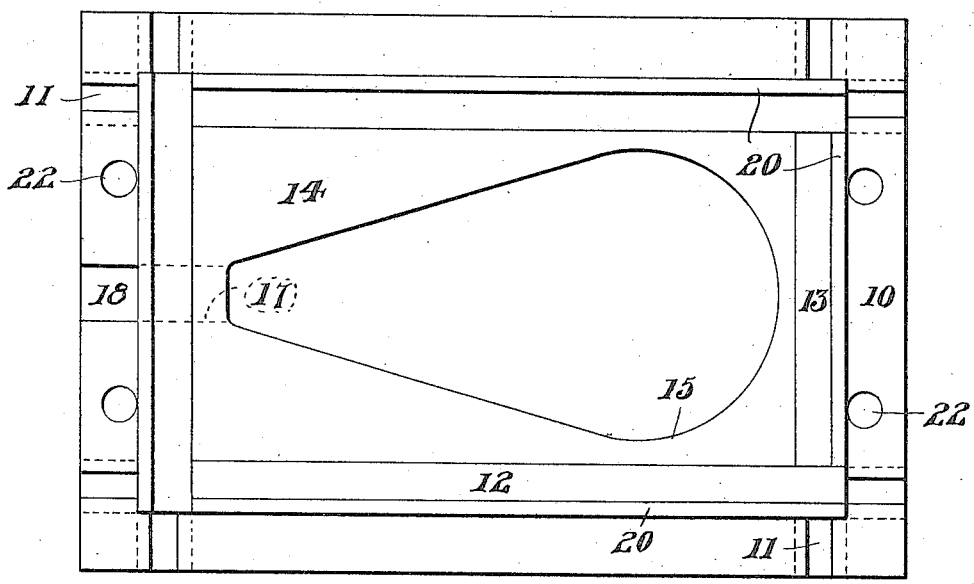
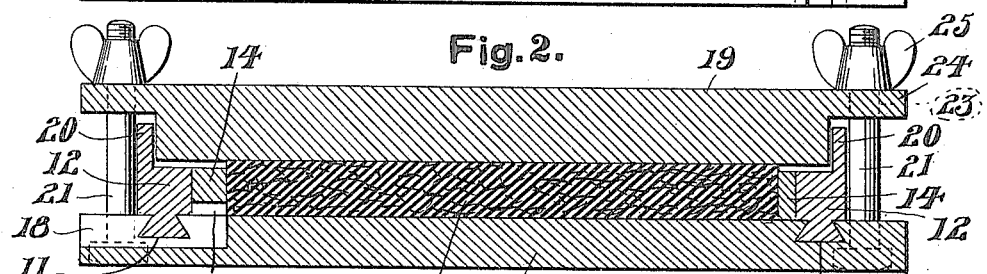
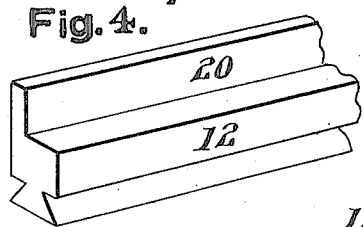
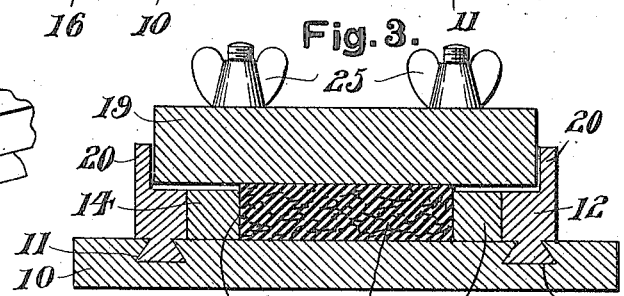
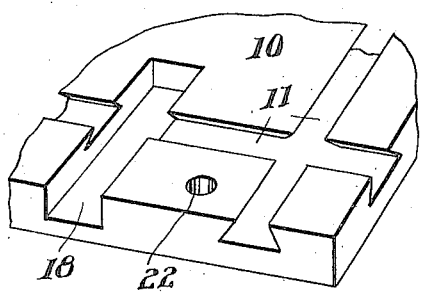
Inventor
P. Smagel
By A. M. Wilson
Attorney

UNITED STATES PATENT OFFICE.

PÉTER SMAGEL, OF AVOCA, PENNSYLVANIA.

HOUSEHOLD-PRESS.

1,161,540.  Specification of Letters Patent.  Patented Nov. 23, 1915.

Application filed May 7, 1915. Serial No. 26,539.

*To all whom it may concern:*

Be it known that I, PÉTER SMAGEL, subject of the Emperor of Austria-Hungary, residing at Avoca, in the county of Luzerne and State of Pennsylvania, have invented certain new and useful Improvements in Household-Presses, of which the following is a specification.

This invention relates to certain new and useful improvements in household presses.

The primary object of the invention is to provide an inexpensive and strong pressing device for household use and especially adapted for pressing and molding such commodities as cheese and butter, the same being also serviceable for extracting the juice from fruit.

A further object of the invention is the provision of an easily operated press having a removable mold or shaping frame within which butter, cheese or fruit may be placed and whereby upon an operation of the device, the contents of the press will be formed into the desired shape simultaneously with the extraction of the juices therefrom.

With these general objects in view and others that will appear as the nature of the invention is better understood, the same consists in the novel combination and arrangement of parts hereinafter more fully described, illustrated in the accompanying drawings, and pointed out in the appended claims.

In the drawings forming a part of this application and in which like-designating characters refer to corresponding parts throughout the several views, Figure 1 is a top plan view of the device with the cover and operating bolts removed. Fig. 2 is a central longitudinal sectional view of the device. Fig. 3 is a central transverse sectional view thereof. Fig. 4 is a perspective view of a portion of one of the removable side members. Fig. 5 is a perspective view of a portion of the press bottom, and Fig. 6 is a similar view of an end portion of a mold frame employed in the press.

Referring more in detail to the drawings, the presser broadly consists of a rectangular bottom 10 having dove-tail slots 11 marginally positioned perpendicularly to each other and with the press sides 12 and ends 13, dove tail sliding connection with the said slots thus providing a rectangular inclosure as best illustrated in Fig. 1.

A mold frame 14 is removably positioned within the inclosure formed by the mold walls 12 and 13 and has a central opening or depression 15 of any desired shape and form and being adapted to receive therein the goods 16 to be pressed. An outlet groove 17 is arranged upon the underside of the mold frame 14 and communicates with the containing chamber 15 for the purpose of allowing any juice or fluid from the pressed goods to freely escape from the said groove and pass outwardly of the mold through an outlet conduit 18 in the upper face of the press bottom 10. A cover 19 is provided for the press being positionable within the marginal flanges 20 of the press walls 12 and 13, the said cover being adapted to seat upon the upper face of the goods within the press for the purpose of operating thereon during the actuation of the press.

Bolts 21 are positioned through perforations 22 in the press bottom 10 and extend through alining perforations 23 in the projecting flange 24 of the cover 19, while winged nuts 25 are screw-threaded upon the upper ends of the said bolts. In assembling the device, the shorter one of the ends 13 is slidably arranged in place upon the base and within one of the transverse slots 11 and thereafter the sides 12 are properly positioned in the opposite longitudinal slots 11 of the base, while the longer end 13 is then positioned in the transverse slot oppositely arranged with respect to the shorter end 13. A mold frame 14 is then positioned within the inclosure formed of the end and side walls 12 and 13, such articles as fruit is positioned within the receiving chamber 15 of the mold frame. The cover 19 is then mounted in position over the fruit and the winged nuts 25 screwed down for pressing the cover against the contained goods and thereby extracting the juices therefrom which pass through the grooves 17 and the outlet conduit 18. Butter and cheese may be molded in the press by placing the same within the chamber 15 and the fluid will be squeezed out of the same, while the goods will take the form of the contour of the chamber 15. It will thus be seen that a serviceable and strong household press is provided which is readily adapted for either the extraction of fluid and juices or molding of goods into desirable forms.

While the form of the invention herein shown and described is what is believed to be the preferred embodiment thereof, it is nevertheless to be understood that minor changes may be made without departing from the spirit and scope of the invention as claimed.

What I claim as new is:—

1. A press comprising a bottom having transverse and longitudinal dove-tail slots perpendicularly arranged, a relatively short and long end wall slidably positioned centrally of the said longitudinal slots, side walls of equal length having dove-tail sliding engagement within the said longitudinal slots, the said side and end walls forming a rectangular inclosure, upwardly projecting flanges upon the said walls, a cover for the said press arranged inwardly of the said flanges and having outwardly projecting marginal flanges, and clamping means between the said bottom and said cover marginal flanges.

2. A press comprising a bottom having transverse and longitudinal dove-tail slots perpendicularly arranged, a relatively short and long end wall slidably positioned centrally of the said longitudinal slots, side walls of equal length having dove-tail sliding engagement within the said longitudinal slots, the said side and end walls forming a rectangular inclosure, a mold frame removably positioned within the said inclosure and having a chamber of predetermined form and an outlet groove upon its underside leading from the said chamber, the said bottom having an outlet conduit in communication with the said groove and also having perforations adjacent the side thereof, a cover positioned above the said chamber and within the margins of the said inclosure and having a perforated marginal projecting flange, clamping bolts projecting through the said bottom and top flange perforations, and winged pressing turn nuts threaded upon the free ends of the said bolts.

In testimony whereof I affix my signature.

PÉTER SMAGEL.

Witnesses:
WLADYSLAW ZIEMIAIESKI,
P. J. CONWAY.

Copies of this patent may be obtained for five cents each, by addressing the "Commissioner of Patents, Washington, D. C."